(12) United States Patent
Paglia et al.

(10) Patent No.: US 9,104,768 B2
(45) Date of Patent: Aug. 11, 2015

(54) PERSON-BASED INFORMATION AGGREGATION

(71) Applicant: Google Inc., Mountain View, CA (US)

(72) Inventors: Marco Paglia, San Francisco, CA (US); Alexander Faaborg, Mountain View, CA (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/243,329

(22) Filed: Apr. 2, 2014

(65) Prior Publication Data

US 2014/0214879 A1    Jul. 31, 2014

Related U.S. Application Data

(63) Continuation of application No. 13/763,200, filed on Feb. 8, 2013, now Pat. No. 8,719,280.

(60) Provisional application No. 61/714,669, filed on Oct. 16, 2012.

(51) Int. Cl.
G06F 17/30    (2006.01)

(52) U.S. Cl.
CPC .... G06F 17/30867 (2013.01); G06F 17/30386 (2013.01)

(58) Field of Classification Search
CPC ............... G06F 17/30867; G06F 17/30386
USPC ............................ 707/732, 748, 805; 715/753
See application file for complete search history.

(56) References Cited

U.S. PATENT DOCUMENTS

| 5,828,882 A | 10/1998 | Hinckley |
| 6,631,363 B1 | 10/2003 | Brown et al. |

(Continued)

FOREIGN PATENT DOCUMENTS

| EP | 1603066 A1 | 7/2005 |
| EP | 1287444 B1 | 7/2007 |
| KR | 20100126718 A | 12/2010 |

OTHER PUBLICATIONS

Condor et al., "Android fundamentals: Status Bar Notifications," May 9, 2011, retrieved from http://mobile.tutsplus.com/tutorials/android/android-fundamentals-status-bar-notifications/, 6 pp.

(Continued)

*Primary Examiner* — Phong Nguyen
(74) *Attorney, Agent, or Firm* — Shumaker & Sieffert, P.A.

(57) ABSTRACT

Techniques are described for aggregating person-based information on a computing device. The computing device includes a display device and one or more processors. The processors are configured to determine a context of the computing device, and identify a contact associated with the currently-executing application and a plurality of contact identifiers associated with the contact. The processors are configured to receive, from two or more different sources and based on at least one contact, information associated with the contact that includes a respective portion of information received from each of the different sources, determine, based on the context of the computing device, a respective priority value for each of the portions of the information, select, based on the respective priority value, one or more portions of the information, and output, for display, a graphical user interface including at least the selected one or more portions of the information.

20 Claims, 6 Drawing Sheets

(56) References Cited

U.S. PATENT DOCUMENTS

| | | |
|---|---|---|
| 7,003,525 B1 | 2/2006 | Horvitz et al. |
| 7,127,394 B2* | 10/2006 | Strong .......................... 704/255 |
| 7,137,099 B2 | 11/2006 | Knight et al. |
| 7,139,718 B2 | 11/2006 | Jeyachandran et al. |
| 7,155,729 B1 | 12/2006 | Andrew et al. |
| 7,194,681 B1 | 3/2007 | Horvitz |
| 7,243,130 B2 | 7/2007 | Horvitz et al. |
| 7,343,365 B2 | 3/2008 | Farnham et al. |
| 7,457,879 B2 | 11/2008 | Horvitz et al. |
| 7,565,403 B2 | 7/2009 | Horvitz et al. |
| 7,743,340 B2 | 6/2010 | Horvitz et al. |
| 7,797,293 B2* | 9/2010 | Pabla et al. .................... 707/705 |
| 7,797,306 B1 | 9/2010 | Pather et al. |
| 7,814,055 B2 | 10/2010 | Hullot et al. |
| 7,844,666 B2 | 11/2010 | Horvitz et al. |
| 7,975,015 B2 | 7/2011 | Horvitz et al. |
| 8,024,415 B2 | 9/2011 | Horvitz et al. |
| 8,082,292 B2 | 12/2011 | Karmakar et al. |
| 8,086,672 B2 | 12/2011 | Horvitz |
| 8,166,392 B2 | 4/2012 | Horvitz |
| 8,332,540 B2 | 12/2012 | Grigsby et al. |
| 8,347,021 B1 | 1/2013 | Phillips et al. |
| 8,364,467 B1 | 1/2013 | Bowman et al. |
| 8,549,441 B2* | 10/2013 | Waldman et al. ............. 715/854 |
| 8,707,201 B1 | 4/2014 | Aradhye et al. |
| 2002/0039070 A1 | 4/2002 | Ververs et al. |
| 2002/0054117 A1 | 5/2002 | Van Dantzich et al. |
| 2002/0087649 A1 | 7/2002 | Horvitz |
| 2002/0198946 A1 | 12/2002 | Wang et al. |
| 2003/0046421 A1 | 3/2003 | Horvitz et al. |
| 2003/0097485 A1 | 5/2003 | Horvitz et al. |
| 2003/0101190 A1 | 5/2003 | Horvitz et al. |
| 2003/0131073 A1 | 7/2003 | Lucovsky et al. |
| 2003/0212646 A1 | 11/2003 | Horvitz |
| 2003/0222765 A1 | 12/2003 | Curbow et al. |
| 2004/0030753 A1 | 2/2004 | Horvitz |
| 2004/0037271 A1 | 2/2004 | Liscano et al. |
| 2004/0061716 A1 | 4/2004 | Cheung et al. |
| 2004/0128359 A1 | 7/2004 | Horvitz et al. |
| 2004/0177053 A1 | 9/2004 | Donoho et al. |
| 2004/0205162 A1 | 10/2004 | Bahr |
| 2004/0225718 A1 | 11/2004 | Heinzel et al. |
| 2005/0076013 A1 | 4/2005 | Hilbert et al. |
| 2005/0091269 A1 | 4/2005 | Gerber et al. |
| 2005/0132016 A1 | 6/2005 | Boone |
| 2005/0136903 A1 | 6/2005 | Kashima et al. |
| 2005/0248437 A1 | 11/2005 | Hellebust et al. |
| 2005/0289180 A1* | 12/2005 | Pabla et al. ................. 707/104.1 |
| 2005/0289470 A1* | 12/2005 | Pabla et al. .................... 715/751 |
| 2006/0025159 A1 | 2/2006 | Estevez et al. |
| 2006/0129947 A1 | 6/2006 | Hamzy et al. |
| 2006/0259537 A1 | 11/2006 | Emberton et al. |
| 2007/0168430 A1 | 7/2007 | Brun et al. |
| 2007/0174768 A1 | 7/2007 | Sen et al. |
| 2007/0207793 A1 | 9/2007 | Myer et al. |
| 2007/0214228 A1 | 9/2007 | Horvitz et al. |
| 2007/0214429 A1 | 9/2007 | Lyudovyk et al. |
| 2007/0288932 A1 | 12/2007 | Horvitz et al. |
| 2008/0046399 A1 | 2/2008 | Goodman et al. |
| 2008/0125103 A1 | 5/2008 | Mock |
| 2008/0198005 A1 | 8/2008 | Schulak et al. |
| 2009/0054040 A1 | 2/2009 | Van Wijk et al. |
| 2009/0089806 A1 | 4/2009 | Mayer |
| 2009/0172120 A1 | 7/2009 | Ruelas |
| 2009/0187846 A1 | 7/2009 | Paasovaara |
| 2009/0276700 A1* | 11/2009 | Anderson et al. ............. 715/700 |
| 2010/0049534 A1 | 2/2010 | Whitnah et al. |
| 2010/0049852 A1 | 2/2010 | Whitnah et al. |
| 2010/0058231 A1 | 3/2010 | Duarte et al. |
| 2010/0082693 A1* | 4/2010 | Hugg et al. .................... 707/798 |
| 2010/0088378 A1 | 4/2010 | Asawa et al. |
| 2010/0115530 A1 | 5/2010 | Ahmad et al. |
| 2010/0122195 A1 | 5/2010 | Hwang |
| 2010/0211644 A1 | 8/2010 | Lavoie et al. |
| 2010/0222027 A1 | 9/2010 | Scott et al. |
| 2010/0228714 A1* | 9/2010 | Carroll .......................... 707/706 |
| 2011/0053672 A1 | 3/2011 | Gagner et al. |
| 2011/0076994 A1 | 3/2011 | Kim et al. |
| 2011/0161427 A1 | 6/2011 | Fortin et al. |
| 2011/0161987 A1 | 6/2011 | Huang et al. |
| 2011/0194676 A1 | 8/2011 | Hogan et al. |
| 2011/0270869 A1 | 11/2011 | Waldron et al. |
| 2012/0072991 A1 | 3/2012 | Belani et al. |
| 2012/0077521 A1* | 3/2012 | Boldyrev et al. .......... 455/456.3 |
| 2012/0078882 A1* | 3/2012 | Boldyrev et al. ............. 707/722 |
| 2012/0084707 A1 | 4/2012 | Abdel-Kader et al. |
| 2012/0089681 A1 | 4/2012 | Chowdhury et al. |
| 2012/0149342 A1 | 6/2012 | Cohen et al. |
| 2012/0150560 A1 | 6/2012 | Ferguson |
| 2012/0151383 A1* | 6/2012 | Kazan et al. ................... 715/753 |
| 2012/0166277 A1* | 6/2012 | Gnanamani et al. ........ 705/14.49 |
| 2012/0166284 A1 | 6/2012 | Tseng |
| 2012/0166433 A1 | 6/2012 | Tseng |
| 2012/0166452 A1 | 6/2012 | Tseng |
| 2012/0166530 A1 | 6/2012 | Tseng |
| 2012/0198002 A1 | 8/2012 | Goulart et al. |
| 2012/0246246 A1 | 9/2012 | Moore |
| 2012/0295645 A1 | 11/2012 | Yariv et al. |
| 2012/0304116 A1 | 11/2012 | Donahue et al. |
| 2012/0304118 A1 | 11/2012 | Donahue et al. |
| 2012/0323933 A1 | 12/2012 | He et al. |
| 2013/0038437 A1 | 2/2013 | Talati et al. |
| 2013/0040610 A1 | 2/2013 | Migicovsky et al. |
| 2013/0130777 A1* | 5/2013 | Lemay et al. ................... 463/25 |
| 2013/0132896 A1* | 5/2013 | Lee et al. ....................... 715/808 |
| 2014/0052488 A1 | 2/2014 | Minder et al. |

OTHER PUBLICATIONS

Holste, "Android SDK: Using Alerts, Toasts and Notifications," Jul. 20, 2010, retrieved from http://mobile.tutsplus.com/tutorials/android/androis-sdk-alert/, 6 pp.

McCrickard et al., "A Model for Notification Systems Evaluation—Assessing User Goals for Multitasking Activity," ACM Transactions on Computer-Human Interaction, vol. 10, No. 4, Dec. 4, 2003, pp. 312-338.

Whitney, "Vibration Examples for Android Phone Development," Mar. 27, 2010, retrieved from http://android.konreu.com/developer-how-to/vibration-examples-for-android-phone-development/, 8 pp.

"Add or remove a reminder for a message or contact," Retrieved from http://office.microsoft.com/en-us/outlook-help/add-or-remove-a-reminder-for-a-messageor-contact-HP001234154.aspx, accessed on Sep. 24, 2012, 2 pp.

Google Play, "Call Reminder Notes by Finmouse," Retrieved from http://play.google.com/store/apps/details?id=com.finmouse.android.callremindernoteslite&feature=search_result, Aug. 27, 2012, 2 pp.

Google Play, "Finmouse Working Smart," Retrieved from http://www.finmouse.com/, accessed on Sep. 24, 2012, 1 p.

LeFebvre, "Set Up a Location-Based Reminder With Maps, [iOS Tips]," Retrieved from http://www.cultofmac.com/168346/set-up-location-based-reminder-with-maps-ios-tips/, May 23, 2012, 4 pp.

U.S. Appl. No. 13/744,053, filed Jan. 17, 2013.

U.S. Appl. No. 13/670,207, filed Nov. 6, 2012.

U.S. Appl. No. 13/763,200, filed Feb. 8, 2013.

Prosecution History from U.S. Appl. No. 13/763,200, from May 20, 2013 through Feb. 10, 2014, 60 pp.

Girardello, et al., "Explicit and Implicit Ratings for Mobile Applications," in GI Jahrestagung (1), pp. 606-612, 2010.

Priority Notifications Lite, Android Apps on Google Play, https://play.google.com/store/apps/details?id=com.appsubstance.prioritynotifications&feature=search_result#?t=W251bGwsMSwxLDEslmNvbS5hcHBzdWJzdGFuY2UucHJpb3JpdHlub3RpZmljYXRpb25zll0., Mar. 22, 2012.

International Search Report and Written Opinion of international application No. PCT/US2013/065166, dated Jan. 23, 2015, 12 pp.

International Preliminary Report on Patentability from International Application No. PCT/US2013/065166, mailed Apr. 30, 2015, 8 pp.

* cited by examiner

PERSON-BASED INFORMATION AGGREGATION

CROSS-REFERENCE TO RELATED APPLICATIONS

This application is a Continuation of U.S. application Ser. No. 13/763,200, filed Feb. 8, 2013, which claims the benefit of U.S. Provisional Application No. 61/714,669, filed Oct. 16, 2012, the entire contents of each of which are incorporated herein in their entirety.

BACKGROUND

As smartphones, tablets, and other mobile computing devices become more powerful and more common, applications for these computerized devices are becoming more widely available. Many smartphones and tablet computers are associated with virtual application stores or markets, and are often provided with several applications offering a set of functions. For example, a user may install a social networking application, an email application, and/or a calendar application on the mobile computing device. Each application may provide a different set of information and/or functionality to the user of the mobile computing device and each may provide information associated with a particular person, location, or event. As the number of available mobile applications increases, the number of sources that may be accessed by the user to view the information associated with a particular person, location, or event also increases, which may make it increasingly difficult for the user to organize and view such information.

SUMMARY

In one example, a method includes determining, by a computing device, a context of the computing device, the context of the computing device including a currently-executing application, and identifying, by the computing device and based on the context of the computing device, a contact associated with the currently-executing application and a plurality of contact identifiers associated with the contact. The method may further include receiving, by the computing device from two or more different sources and based on at least one contact identifier from the plurality of contact identifiers, information associated with the contact, wherein the information includes a respective portion of information received from each of the two or more different sources, and wherein the information associated with the contact includes information other than the plurality of contact identifiers associated with the contact, and determining, by the computing device and based on the context of the computing device, a respective priority value for each of the portions of the information. The method may further include selecting, by the computing device and based on the respective priority value, one or more portions of the information; and outputting, by the computing device and for display, a graphical user interface including at least the selected one or more portions of the information.

In another example, a computer-readable storage medium is encoded with instructions that, when executed, cause one or more processors of a computing device to determine a context of the computing device, the context of the computing device including a currently-executing application, and identify, based on the context of the computing device, a contact associated with the currently-executing application and a plurality of contact identifiers associated with the contact. The instructions may also cause the one or more processors of the computing device to receive, from two or more different sources and based on at least one contact identifier from the plurality of contact identifiers, information associated with the contact, wherein the information includes a respective portion of information received from each of the two or more different sources, and wherein the information associated with the contact includes information other than the plurality of contact identifiers associated with the contact, and determine, based on the context of the computing device, a respective priority value for each of the portions of the information. The instructions may also cause the one or more processors of the computing device to select, based on the respective priority value, one or more portions of the information, and output, for display, a graphical user interface including at least the selected one or more portions of the information.

In another embodiment, the disclosure is directed to a computing device, comprising a display device and one or more processors. The one or more processors are configured to determine a context of the computing device, the context of the computing device including a currently-executing application, identify, based on the context of the computing device, a contact associated with the currently-executing application and a plurality of contact identifiers associated with the contact, and receive, from two or more different sources and based on at least one contact identifier from the plurality of contact identifiers, information associated with the contact, wherein the information includes a respective portion of information received from each of the two or more different sources, and wherein the information associated with the contact includes information other than the plurality of contact identifiers associated with the contact. The one or more processors may be further configured to determine, based on the context of the computing device, a respective priority value for each of the portions of the information, select, based on the respective priority value, one or more portions of the information, and output, for display, a graphical user interface including at least the selected one or more portions of the information.

The details of one or more examples of the disclosure are set forth in the accompanying drawings and the description below. Other features, objects, and advantages will be apparent from the description and drawings, and from the claims.

DETAILED DESCRIPTION

In general, this disclosure is directed to techniques for aggregating and presenting information associated with a contact (e.g., a person, a business, etc.) that is identified by a computing device based on a context of the computing device. For example, the context of the computing device may include an application currently-executing at the computing device, the location of the computing device, a current time, scheduled events, etc. In determining the context of the computing device, the computing device may determine that a contact and related contact identifier (e.g., name, telephone number, address, email address, user account information, instant messaging username, or other identifying information associated with a contact) is included within or otherwise associated with information displayed at a screen of the computing device. Based on the determined contact, the computing device may identify various other contact identifiers associated with the contact, such as phone numbers, names, addresses, email addresses, instant messaging handles, etc. Using the various contact identifiers, the computing device may retrieve additional information associated with the contact from multiple sources by, for example, searching for information that corresponds to any one of the contact identifiers and by accessing social networking, instant messaging, email, and other services.

In this way, a computing device configured in accordance with techniques of the disclosure can retrieve and aggregate information associated with the contact and associated with a context of the computing device from a variety of sources using various different contact identifiers. Techniques of this disclosure may also enable a computing device to automatically display information associated with a specific person and retrieved from various sources based on a current context of the computing device. By automatically aggregating and presenting this information, techniques of the disclosure may relieve a user from searching through various sources for information related to an email, phone call, text message, social network post, map, or other information currently displayed by a computing device. In this manner, the computing device may automatically aggregate and display the contact-specific information at a time when the information may be relevant and useful to the user.

Figure 1:
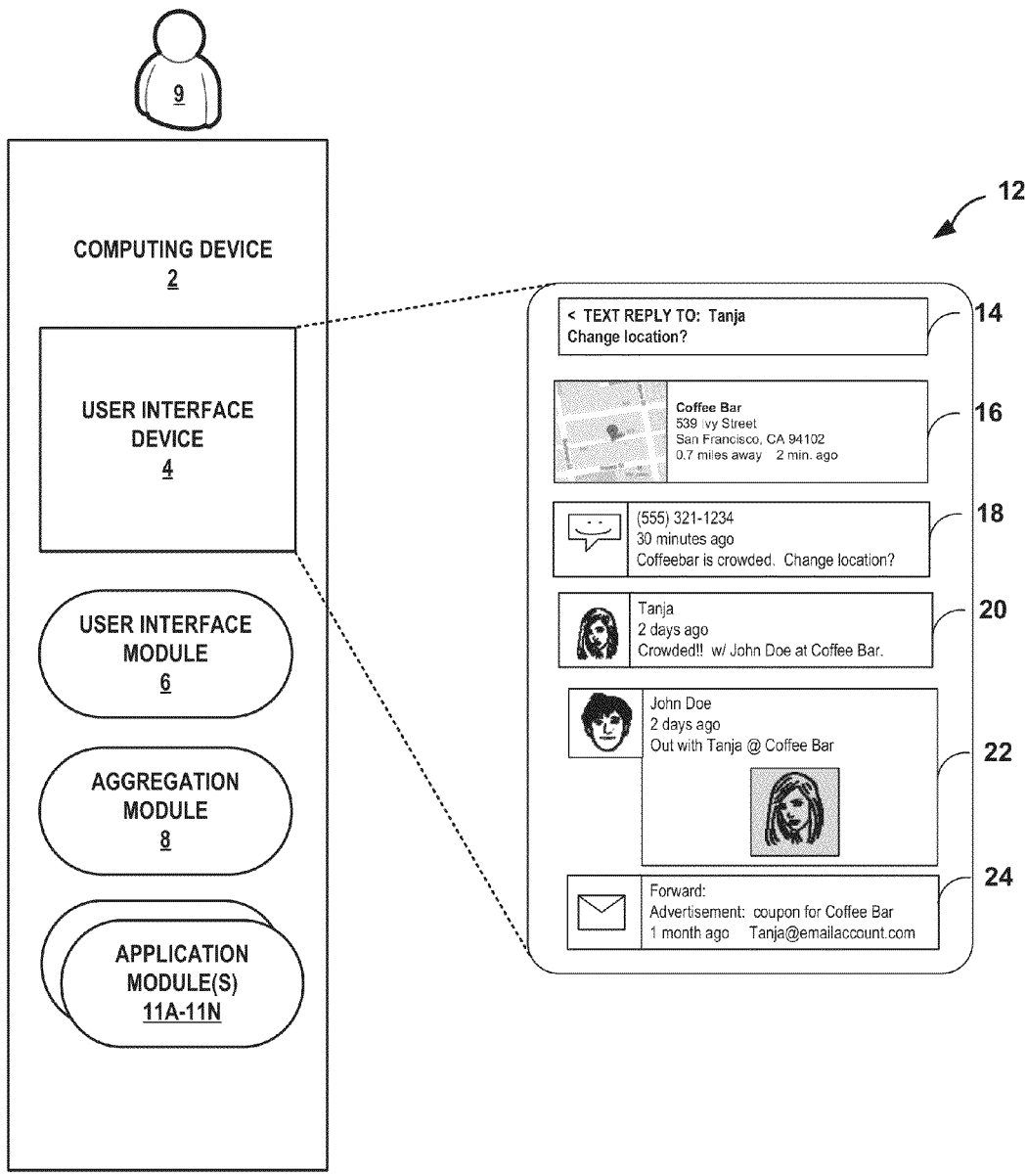
FIG. 1 is a conceptual diagram illustrating an example of a computing device for aggregating person-based information, in accordance with one or more aspects of the present disclosure.

FIG. 1 is a conceptual diagram illustrating an example of a computing device for aggregating person-based information, in accordance with one or more aspects of the present disclosure. Computing device 2 may include one or more stand-alone devices or may be part of a larger system. For instance, computing device 2 may include a smart phone, tablet, personal digital assistant, computer, or other computing device. As shown in FIG. 1, computing device 2 may include user interface (UI) device 4, UI module 6, aggregation module 8, and one or more application modules 11A-11N. Other examples of a computing device 2 that implement techniques of the disclosure may include additional components not shown in FIG. 1.

In some examples, UI device 4 is configured to receive tactile, audio, or visual input. UI device 4, as shown in FIG. 1, may include a touch-sensitive and/or presence-sensitive display or any other type of device for receiving input. UI device 4 may output content such as graphical user interface (GUI) 12 for display. In the example of FIG. 1, UI device 4 may be a presence-sensitive display that can display a graphical user interface and receive input from user 9 using capacitive, inductive, and/or optical detection at or near the presence sensitive display.

UI module 6 may perform one or more functions to receive input, such as user input or network data, and send such input to other components associated with computing device 2, such as aggregation module 8. For example, UI module 6 may determine input, such as a gesture, performed by user 9 at UI device 4. UI module 6 may also receive data from components associated with computing device 2, such as aggregation module 8. Using the data, UI module 6 may cause other components associated with computing device 2, such as UI device 4, to provide output based on the data. For instance, UI module 6 may receive data from aggregation module 8 that causes UI device 4 to display GUI 12.

UI module 6 may be implemented in various ways. For example, UI module 6 may be implemented as a downloadable or pre-installed application. In another example, UI module 6 may be implemented as part of a hardware unit of computing device 2. In another example, UI module 6 may be implemented as part of an operating system of computing device 2.

Aggregation module 8 may include functionality to perform any variety of operations on computing device 2. For instance, aggregation module 8 may include functionality to identify a context of the computing device, a contact, and contact identifiers associated with the contact, and to aggregate information about the contact in accordance with techniques described herein. Aggregation module 8 may be implemented in various ways. For example, aggregation module 8 may be implemented as a downloadable or pre-installed application or "application." In another example, aggregation module 8 may be implemented as part of a hardware unit of computing device 2. In another example, aggregation module 8 may be implemented as part of an operating system of computing device 2.

Aggregation module 8 may receive data from components associated with computing device 2, such as UI module 6. For instance, aggregation module 8 may receive user input data from UI module 6 that causes aggregation module 8 to determine a contact (e.g., a person, a business, an organization, or other entity). User input data from UI module 6 may also cause aggregation module 8 to determine the contact from the action represented by the input data, such as replying to an email. Aggregation module 8 may also send data to other components of computing device 2. For instance, aggregation module 8 may send an inquiry for information based on the contact to application modules 11. Aggregation module 8 may also send data to components associated with computing device 2, such as UI module 6. For instance, aggregation module 8 may send the contact or associated contact identifiers determined from the data to UI module 6 that causes UI device 4 to display the data at GUI 12.

Application modules 11A-11N (collectively, "application modules 11") may include functionality to perform any variety of operations. Application modules 11 may execute functions for a specific application, such as a text application, photo viewer, social networking service, video application, email application, word processor, spreadsheet, web browser, multimedia player, server application, image capture application, audio application, etc. In various instances, aggregation module 8 and one or more of applications modules 11 may exchange data. For example, aggregation module 8 may send a request for data to one of application modules 11 associated with a contact (e.g., application module 11A). In response, application module 11A retrieves information based on the request and sends the retrieved information to aggregation module 8. In general, each of application modules 11 may retrieve information based on the request and send any identified information to aggregation module 8 that is associated with the contact.

As shown in FIG. 1, GUI 12 may be a user interface generated by UI module 6 that allows user 9 to interact with computing device 2. GUI 12 may include graphical content, such as text, images, a group of moving images, etc. As shown in FIG. 1, graphical content may include the aggregated information received from aggregation module 8. The information may be grouped together based on the context of the computing device. In some examples, the information may be displayed within GUI 12 as a visual notification, such as notifications 16, 18, 20, 22, and 24. Each notification may include at least a portion of the retrieved information. GUI 12 may also include an indication of the application currently-executing at computing device 2 (e.g., application indication 14). Aggregation module 8 may determine a context of a computing device. For example, aggregation module 8 may determine the context of computing device 2 by determining which application is currently-executing at computing device 2, the location of the device, the current date and time, etc. To identify the currently-executing application, aggregation module 8 may monitor all processes currently-executing at computing device 2. Aggregation module 8 may identify the application based on the process name, file name, or file path of the application associated with the executing process.

In some examples, aggregation module 8 may monitor function calls generated by currently-executing application (e.g., one or more of applications 11). The function calls may indicate resources of the computing device that each application is attempting to use, thereby determining which applications, if any are accessing application programming interfaces (APIs) for generating or updating a graphical user interface. The application request for a user interface-related API may indicate that the particular application is the application currently generating the user interface for output at UI device 4 of computing device 2 (e.g., the currently-executing application).

Aggregation module 8 may receive information from one or more sensors, communication units, or other elements of computing device 2 and, based on the received information, determine a location of computing device 2. For example, computing device 2 may communicate with a remote computing system or service provider using a network communication element. In this example, computing device 2 may determine its location by using cellular tower triangulation. In another example, computing device 2 may determine the location based on a global positioning system (GPS) signal received at a GPS radio of computing device 2.

In response to identifying the context of computing device 2, aggregation module 8 may identify a contact based on the context of computing device 2, including information about the application currently executed by computing device 2. A contact may be a person, business, event, location, landmark, or other entity. Aggregation module 8 may identify the contact by locating contact identification information based on information about the application, including the type of the application. Various applications (such as email, text message, game, calendar, social networking application, photo/video, telephone, etc.) may contain different information about a contact. For example, email applications may include email messages and an email address as the contact identifier while a social networking applications may include contact information for users of the social networking service associated with a social network of a user. Further, different types of applications may refer to the same contact differently. For example, and email application may identify an email address as the contact, but a telephone application may identify a telephone number for the same contact.

In some examples, aggregation module 8 may search for information for a specific contact by identifying contact identifiers associated with the specific contact. Contact identifiers may include alternative references to the contact, such as names, nicknames, phone numbers, user names, email addresses, account names, social networking names, addresses, etc. Aggregation module 8 may include a request for additional contact identifiers within a request for information that aggregation module 8 may send to each application and service. Aggregation module 8 may use the contact identifiers provided by the applications and services to retrieve additional information associated with the contact from different applications and services, such that aggregation module 8 may retrieve additional information about a particular contact that may otherwise not be available to aggregation module 8.

Computing device 2 may execute one of application modules 11, such as a text message application. As shown in FIG. 1, user 9 may respond to a text message from "Tanja." Responsive to aggregation module 8 identifying that the text message application is currently-executing, aggregation module 8 may identify "Tanja" as a contact based on the sender of the text message. Aggregation module 8 may identify alternative contact information for "Tanja," such as a social networking username, a phone number, an email address, etc. by sending a request for information associated with the contact to one or more of application modules 11. Each application module 11 that receives a request may retrieve data that is associated with the contact and that is maintained by the respective application module 11. In some examples, aggregation module 8 may receive information associated with the contact from a plurality of different sources. For example, one or more of application modules 11 may retrieve information from a cloud service or other computing systems accessible using a network (e.g., a cellular network, a data network, etc.) as well as from a data repository of computing device 2.

Aggregation module 8 may also generate a request for information based on "Tanja" all associated contact identifiers associated with "Tanja," including the additional contact identifiers received in response to the request for information sent to application modules 11, and send the request to one or more of application modules 11. Application modules 11 may identify information associated with any of the contact identifiers for "Tanja." For example, one of application modules 11 (e.g., application module 11A) may be a social networking service. Application module 11A may identify the content of social network service notification 16 that identifies a recent social network service post associated with Tanja. As another example, a text message application may identifier additional text messages, as shown by text message notification 18, originating from "Tanja" based on by her telephone number. Similarly, an email application may identifier one or more email messages associated with Tanja, as shown by email message notification 24, from an email account identified by an email address associated with Tanja as identified by an email address. In general, aggregation module 8 may receive the information from the various application modules 11 and output the information to UI module 6 for inclusion within GUI 12.

Techniques of this disclosure may enable a computing device to automatically display information associated with a specific person and retrieved from various sources based on a current context of the computing device. By automatically aggregating and presenting this information, techniques of the disclosure may relieve a user from searching through various sources for information related to an email, phone call, text message, social network post, map, or other information currently displayed by a computing device. In this manner, the computing device may automatically aggregate and display the person-specific information at a time when the information may be relevant and useful to the user.

Figure 2:
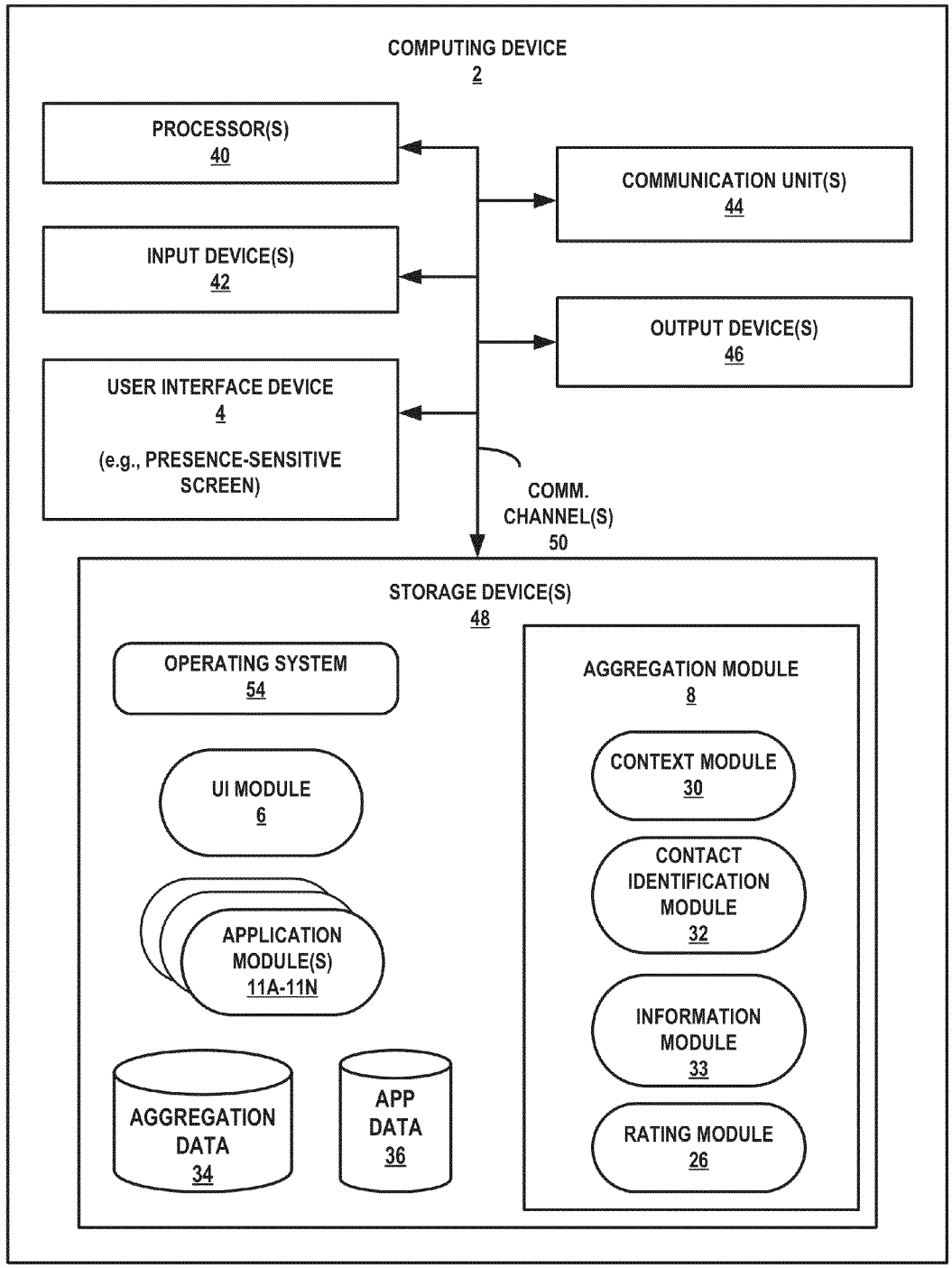
FIG. 2 is a block diagram illustrating further details of an example computing device for aggregating information, in accordance with one or more techniques of the present disclosure.

FIG. 2 is a block diagram illustrating further details of an example computing device for aggregating information, in accordance with one or more techniques of the present disclosure. FIG. 2 illustrates one example of computing device 2, and may other examples of computing device 2 may be implemented.

As shown in the specific example of FIG. 2, computing device 2 includes one or more processors 40, one or more input devices 42, one or more communication units 44, one or more output devices 46, one or more storage devices 48, and user interface (UI) device 4. Although shown in FIGS. 1 and 2 as a stand-alone computing device 2 for purposes of example, a computing-device may be any component or system that includes a processor 40 or other suitable computing environment for executing software instructions and, for example, need not include presence-sensitive display 4. Computing device 2, in one example further includes UI module 6, aggregation module 8 (including context module 30, contact identification module 32, information module 33 and rating module 26), and operating system 54 that are executable by computing device 2. Each of components 4, 40, 42, 44, 46, and 48 may be interconnected (physically, communicatively, and/or operatively) for inter-component communications. In some examples, communication channels 50 may include a system bus, a network connection, an inter-process communication data structure, or any other method for communicating data. As one example in FIG. 2, components 4, 40, 42, 44, 46, and 48 may be coupled by one or more communication channels 50. UI module 6 and aggregation module 8 (including context module 30 and contact identification module 32) may also communicate information with one another as well as with other components in computing device 2, such as applications modules 11.

Processors 40, in one example, are configured to implement functionality and/or process instructions for execution within computing device 2. For example, processors 40 may be capable of processing instructions stored in storage device 48. Examples of processors 40 may include, any one or more of a microprocessor, a controller, a digital signal processor (DSP), an application specific integrated circuit (ASIC), a field-programmable gate array (FPGA), or equivalent discrete or integrated logic circuitry.

One or more storage devices 48 may be configured to store information within computing device 2 during operation. Storage device 48, in some examples, is described as a computer-readable storage medium. In some examples, storage device 48 is a temporary memory, meaning that a primary purpose of storage device 48 is not long-term storage. Storage device 48, in some examples, is described as a volatile memory, meaning that storage device 48 does not maintain stored contents when the computer is turned off. Examples of volatile memories include random access memories (RAM), dynamic random access memories (DRAM), static random access memories (SRAM), and other forms of volatile memories known in the art. In some examples, storage device 48 is used to store program instructions for execution by processors 40. Storage device 48, in one example, is used by software or applications running on computing device 2 (e.g., aggregation module 8) to temporarily store information during program execution.

Storage devices 48, in some examples, also include one or more computer-readable storage media. Storage devices 48 may be configured to store larger amounts of information than volatile memory. Storage devices 48 may further be configured for long-term storage of information. In some examples, storage devices 48 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 2, in some examples, also includes one or more communication units 44. Computing device 2, in one example, utilizes communication unit 44 to communicate with external devices via one or more networks, such as one or more wireless networks. Communication unit 44 may be a network interface card, such as an Ethernet card, an optical transceiver, a radio frequency transceiver, or any other type of device that can send and receive information. Other examples of such network interfaces may include Bluetooth, 3G and WiFi radios computing devices as well as Universal Serial Bus (USB). In some examples, computing device 2 utilizes communication unit 44 to wirelessly communicate with an external device such as a server.

Computing device 2, in one example, also includes one or more input devices 42. Input device 42, in some examples, is configured to receive input from a user through tactile, audio, or video feedback. Examples of input device 42 include a presence-sensitive display, a mouse, a keyboard, a voice responsive system, video camera, microphone or any other type of device for detecting a command from a user. In some examples, a presence-sensitive display includes a touch-sensitive screen.

One or more output devices 46 may also be included in computing device 2. Output device 46, in some examples, is configured to provide output to a user using tactile, audio, or video stimuli. Output device 46, in one example, includes a presence-sensitive display, a sound card, a video graphics adapter card, or any other type of device for converting a signal into an appropriate form understandable to humans or machines. Additional examples of output device 46 include a speaker, a cathode ray tube (CRT) monitor, a liquid crystal display (LCD), or any other type of device that can generate intelligible output to a user. In some examples, UI device 4 may include functionality of input device 42 and/or output device 46. In the example of FIG. 2, UI device 4 may be a touch-sensitive screen.

Computing device 2 may include operating system 54. Operating system 54, in some examples, controls the operation of components of computing device 2. For example, operating system 54, in one example, facilitates the communication of UI module 6 and/or aggregation module 8 with processors 40, communication unit 44, storage device 48, input device 42, and output device 46. UI module 6 and aggregation module 8 may each include program instructions and/or data that are executable by computing device 2. As one example, UI module 6 may include instructions that cause computing device 2 to perform one or more of the operations and actions described in the present disclosure.

Computing device 2 may store application data in application store 36. Application data may include contact data and contact identifiers. Other data may include account information. In some examples, application data 36 may also include data received or created by the respective application associated with application data 36, such as communications, objects, contacts, application settings, etc.

Aggregation data 34 may store contact information identified using techniques of this disclosure. For example, aggregations data 34 may store contact identifiers associated with the contact identified in a specific context of computing device 2. Aggregation module 8 may access the data stored in aggregation data 34, such as identified contact identifiers associated with contacts. Aggregation data may also include previously aggregated information stored in association with computing device context data and the contact at a different time for aggregating information.

Computing device 2 can include additional components that, for clarity, are not shown in FIG. 2. For example, computing device 2 can include a battery to provide power to the components of computing device 2. Similarly, the components of computing device 2 shown in FIG. 2 may not be necessary in every example of computing device 2. For example, in some configurations, computing device 2 may not include communication unit 44.

Computing device 2 may execute an application that includes contact information within a GUI, such as GUI 12 of FIG. 1. In some examples, context module 30 may identify the application currently-executing by computing device 2. For example, aggregation module 8 may cause context module 30 to identify the currently-executing application and associated operations to identify a context of computing device 2 and facilitate identification of a contact associated with the context. In response to identifying the currently-executing application, aggregation module 8 may cause contact identification module 32 to identify the contact identified by the executing application. In response to identifying the contact, contact identification module 32 may automatically perform operations to identify other contact identifiers associated with the contact.

Contact identification module 32 may send a request to application modules 11 for other contact identifiers associated with the identified contact. Contact identification module 32 may also send a request to application modules 11 for information about the contact and any contact identifiers identified by application modules 11 that are associated with the contact. For example, application modules 11 may retrieve stored data from application data 36, which stores data for each of the respective applications at computing device 2. In other examples, in response to the request for data by contact identification module 32, one or more of application modules 11 may communicate with a remote computing system associated with the respective application. The request for data, or information, may include association of the contact and the contact identifiers, including associated application data, from application modules 11.

The respective one of application modules 11 may send the request for contact associated information, including contact identifiers and application data associated with the located contact associated information, to communication unit 44. Communication unit 44 may send the request to the network of the associated computing system. The computing system associated with the application may then perform one or more operations to retrieve the information, including contact identifiers associated with the contact, information associated with the contact and associated contact identifiers, and application data associated with the information. In response to retrieving contact data and contact identifier data, the computing system associated with the application may send the data to the respective application of computing device 2 associated with the computing system. The application may then send the information to contact identification module 32.

In response to receiving the information, aggregation module 8 may send the received information to information module 33 to group the received information associated with the application and context of the information, such as associated application executed, date and time of execution, and contact data, together to create the notification. Information module 33 may then send the formatted notification information to output device 46 to output the information at GUI 12.

In some examples, aggregation module 8 may output all the notifications at GUI 12. In other examples, aggregation module 8 may determine a priority rating for each of the pieces of information received by information module 33. Techniques of priority rating are described in further detail in FIG. 4. In some examples, GUI 12 may include only a portion of the received information in the notifications from all of the data received by aggregation module 8. For example, in response to receiving a large amount of data in response to the request for information, rating module 26 may rate each piece of information associated with the particular notification. In one example, rating module 26 may determine a value for the piece of information associated with the respective notification to determine if the piece of information should be included.

In another example, rating module 26 may determine a rating value for the notification. The rating value of the notification may be based on the rating value of for each piece of information associated with the notification. For example, rating module 26 may base the rating value on the highest rating value of all pieces of information of information associated with the notification. In response to determining rating values, rating module 26 may send an indication to aggregation module 8 that includes the determined the rating values.

In response to receiving the indication from rating module 26, aggregation module 8 may send data for the notifications, including the associated information, to UI module 6. The indication data may include only a portion of the notifications that have a value indicating including the notification in the output displayed at GUI 12. UI device 4 may output one or more pieces of information for display at the presence-sensitive display. Where aggregation module 8 does not use rating techniques, aggregation module 8 may send all of the information to UI module 6 for display at the presence-sensitive display.

In some implementations, aggregation module 8 may be configured to store in a memory the information associated with aggregations 8 after generating the respective aggregated notifications (e.g., notifications 52, 54, 56, 58, and 62). In other implementations, aggregation module 8 can be configured to receive the information associated with the respective aggregation from the respective ones of application modules 11 or from an operating system of computing device 2, e.g., from an event manager of the operating system.

In response to aggregation module 8 sending the data to UI module 6 for output, the information may be stored at computing device 2. For example, computing device 2 may store the information in aggregation data 34. The information stored may include the identified contact and contact identifiers associated with the contact, data associated with the context of the computing device, application data associated with the retrieved information, and rating values, where rating values apply. The techniques are further described below in the description of FIG. 3.

Figure 3:
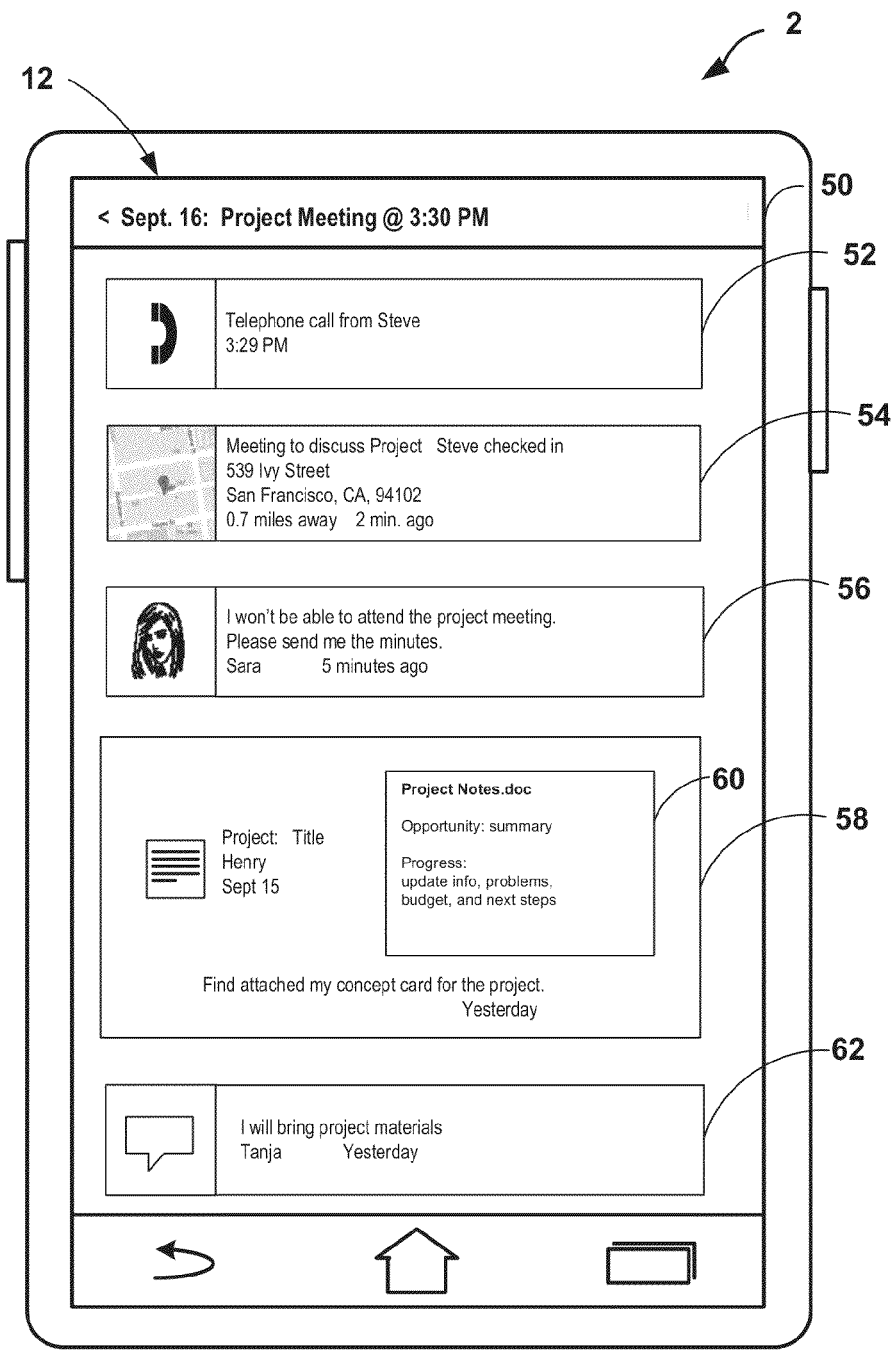
FIG. 3 is a conceptual diagram illustrating a graphical user interface associated with person-based information aggregation, in accordance with one or more aspects of the present disclosure.

FIG. 3 is a conceptual diagram illustrating a graphical user interface associated with person-based information aggregation, in accordance with one or more aspects of the present disclosure. For purposes of illustration only, graphical user interface 12 will be described with respect to computing device 2 of FIGS. 1 and 2.

FIG. 3 illustrates an example of computing device 2 executing a calendar application when generating scheduled event notification 50. In response to calendar application generating a calendar event notification 50, aggregation module 8 of computing device 2 may identify the recipients of the calendar event "Project Meeting" and retrieve information from the invitees of the event "Project Meeting." Aggregation module 8 may cause GUI 12 to output the retrieved information about the event and display the information (e.g., as notifications 52, 54, 56, 58, and 62) at GUI 12, enabling user 9 to review the information when the event notification is generated.

In the example of FIG. 3, computing device 2 may identify the context of computing device 2 as including a calendar application as a currently-executing application (e.g., generating scheduled event notification 50). Computing device 2 may also identify the contact as the invitees associated with the scheduled calendar event "project meeting" using techniques of this disclosure. In response to identifying the invitees for the "project meeting," aggregation module 8 may retrieve information about the invitees. The information may appear at GUI 12 in an ordered list, displaying the information per context of a particular application generated the information.

In some examples, the pieces of information associated with the person may only be available to aggregation module 8 if a user of computing device 2 provides permission for aggregation module 8 to access the information. For example, some of the applications executed by computing device 2 may require permission prior to accessing application information. In these instances, aggregation module 8 may cause GUI 12 to display a request for permission to access the application information. In other examples, the respective application may allow user 9 access to the information without being prompted. Aggregation module 8 or a system-wide settings application or service may provide a configuration user interface that enables the user to select the scope of information the user to which access is granted to aggregation module 8.

As illustrated in the example of FIG. 3, computing device 2 may execute one of applications 12, for example a calendar application 50, in a particular context. The context of the application may include at least one of a type of application module, the identity (e.g., name) of the application, or information associated with an activity the application is performing. In response to identifying the contact, computing device 2 may retrieve information associated with the identified contact from applications executed by computing device 2. For example, user 9 may have an account with a social networking service and be able to access their account with an application executed by computing device 2. User 9 may have account access information saved at computing device 2, or user 9 may be prompted to enter account verification information. Once account authentication is verified and account access is granted, GUI 12 may automatically display the notification associated with the identified contact, such as Steve's social networking update 54.

Notifications may include information accessible only through executed applications, such as telephone call information 52, including call information or voicemail messages. In another example, social networking users associated with the social network of user 9 may communicate with the social network of user 9. The communications may be included in the notifications, such as location identifier 54 and communication 56. Some applications may contain objects, documents, and other data. The notifications may include data that was included in a communication or as an attachment to the communication, and may include the all or part of the objects, document, or data as illustrated by notification 58. A portion of the document 60 is identified in the notification that was an attachment to an email message 58.

In the example of FIG. 3, notifications may include information after computing device 2 authenticates access to the information prompted. The application may grant access on a system-wide level or based on the type of information.

Figure 4:
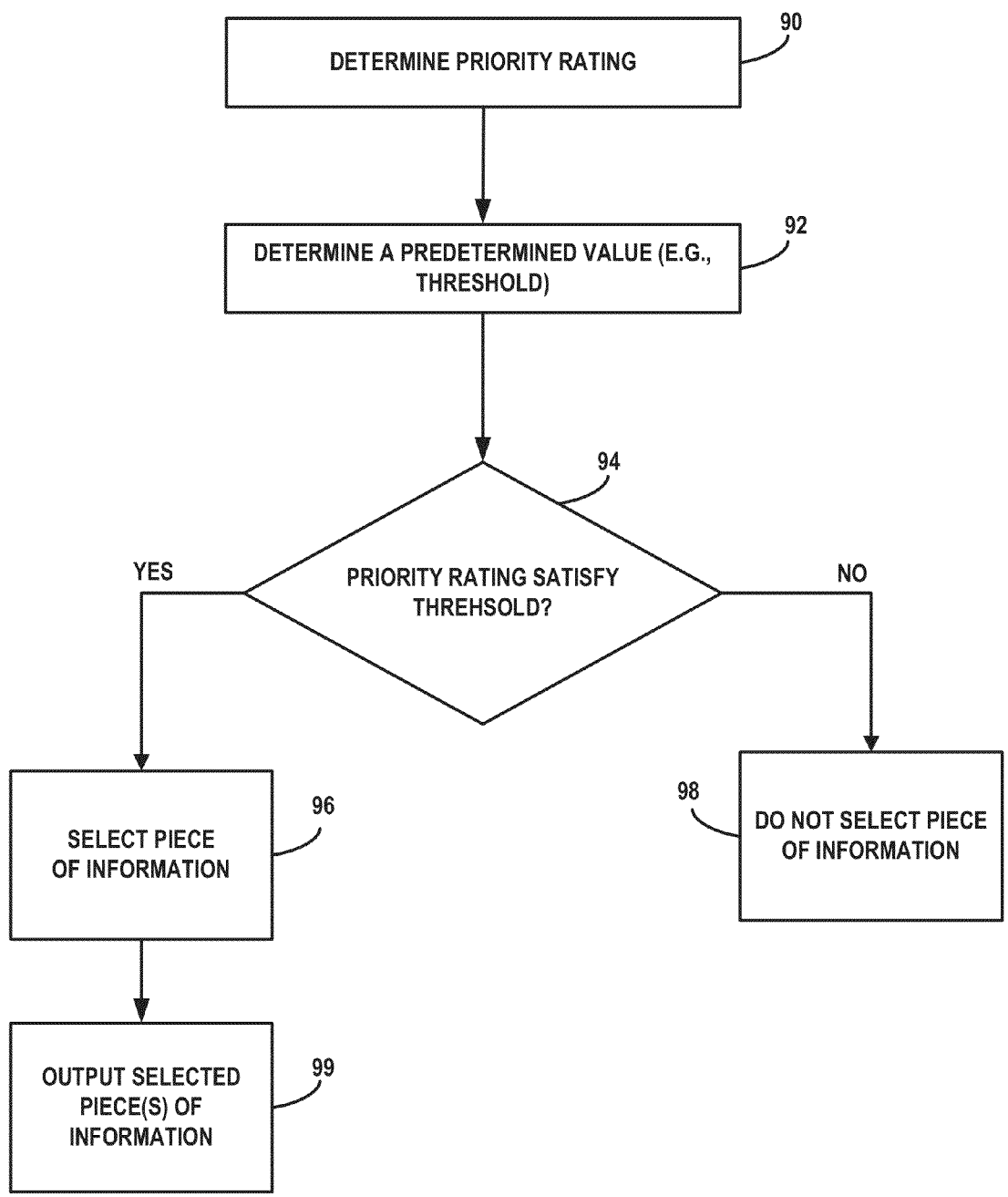
FIG. 4 is a flowchart illustrating an example process for prioritizing information for use in person-based information aggregation, in accordance with one or more aspects of the present disclosure.

FIG. 4 is a flowchart illustrating an example process for prioritizing information for use in person-based information aggregation, in accordance with one or more aspects of the present disclosure. For purposes of illustration only, the process of FIG. 4 is described below with respect to computing device 2 of FIGS. 1 and 2 and GUI 12 of FIG. 1.

Aggregation module 8 may retrieve one or more pieces of information based on an identified contact. In some examples, aggregation module 8 may retrieve a substantial amount of data. To limit the data displayed at GUI 12, computing device 2 may determine a priority rating for each piece of information. The priority rating, generally, is a score, or number value, representing the predicted relevance to the user in a particular context and for the identified contact. Aggregation module 8 may base the priority rating value on data retrieved with the information, including associated application data, and the contact and associated contact identifiers.

As shown in FIG. 4, aggregation module 8 may retrieve many, e.g., more than 5, pieces of information for a determined contact. In response to receiving many pieces of information, aggregation module 8 determines a priority rating value for each piece of information (90). For instance, aggregation module 8 can be configured to assign a higher priority to the information of a similar or same type as the application that is currently-executing by computing device 2. A higher priority rating may be given to the information when aggregation module 8 identifies multiple pieces of information that match information in the currently-executing application and the application sending the retrieved information. In the example of FIG. 3, the displayed pieces of information have a higher priority rating due to the Aggregation module 8 may give a higher priority rating to information more recent in time or from associated with an application that is more frequently used. Aggregation module 8 can alternatively or additionally compare the identity of the application being executed by computing device 2 to the application from which aggregation module 8 received the instruction to generate the respective information. Aggregation module 8 may assign a higher priority value to the information based on an instruction from the currently executed application compared stored information from another one of applications 12.

Further, in some instances, for each piece of information, aggregation module 8 can compare the information associated with the activity performed by applications 12 and information stored in the respective application. Aggregation module 8 may then assign a higher priority rating to a piece of information that is more closely related to the activity that the executed application is performing. For example, when the user is posting on a social networking message on the user's account, older posts to the identified person would have a higher priority rating. In an alternative example, applications 12 locates a birthday notification event for a specific person in a calendar application, when the name of the specific person is identified in an email that the user is composing, on the same day as the specific person's birthday, then generating the event on the same day will increase the priority rating for the birthday information associated with the recipient of the email. Aggregation module 8 may analyze and compare any kind of information associated with stored information of applications 12, such as type of information, date and time of the information or execution of the respective application, recency and frequency of executing the respective application, and with the activity performed by the application.

In one example, in the example of FIG. 1, the recipient of the text message, "Tanja," may have an association with the same social networking service of the user. The association may cause the social networking posts to receive a higher priority rating. The time associated with the data may also increase the priority score, such as text message 18 received 30 minutes ago may receive a higher priority rating over information received at an earlier time, such as email 24 received 1 month ago.

Computing device 2 may determine threshold value based on the overall priority rating scores of the pieces of information (92). For example, aggregation module 8 may select the pieces of information with the top 1-20% of scores. For example, aggregation module 8 may determine a threshold value based on all the priority rating values. The value may identify a priority rating value at the 20% of all scores and determine this value as the threshold value.

Aggregation compares the determined priority rating value to a threshold value to determine which pieces of information to select as information associated with the contact (94). By setting a threshold value, aggregation module 8 may filter the information to improve the accuracy of the retrieved information and the relevancy of the information. For each sharing service with a probability rating value that does not satisfy the threshold value (e.g., is lower than the threshold value) ("NO" branch of 94), computing device 2 does not select the respective piece of information for display at GUI 12 (98). For each piece of information with a probability value that satisfies the threshold value (e.g., is greater the threshold value) ("YES" branch of 94), aggregation module 8 selects the respective piece of information as a piece of information associated with the contact (96). Computing device 10 displays the selected preferences at GUI 12 (99). In some examples, aggregation module 8 outputs the retrieved pieces of information based on the determined probability value.

Figure 5:
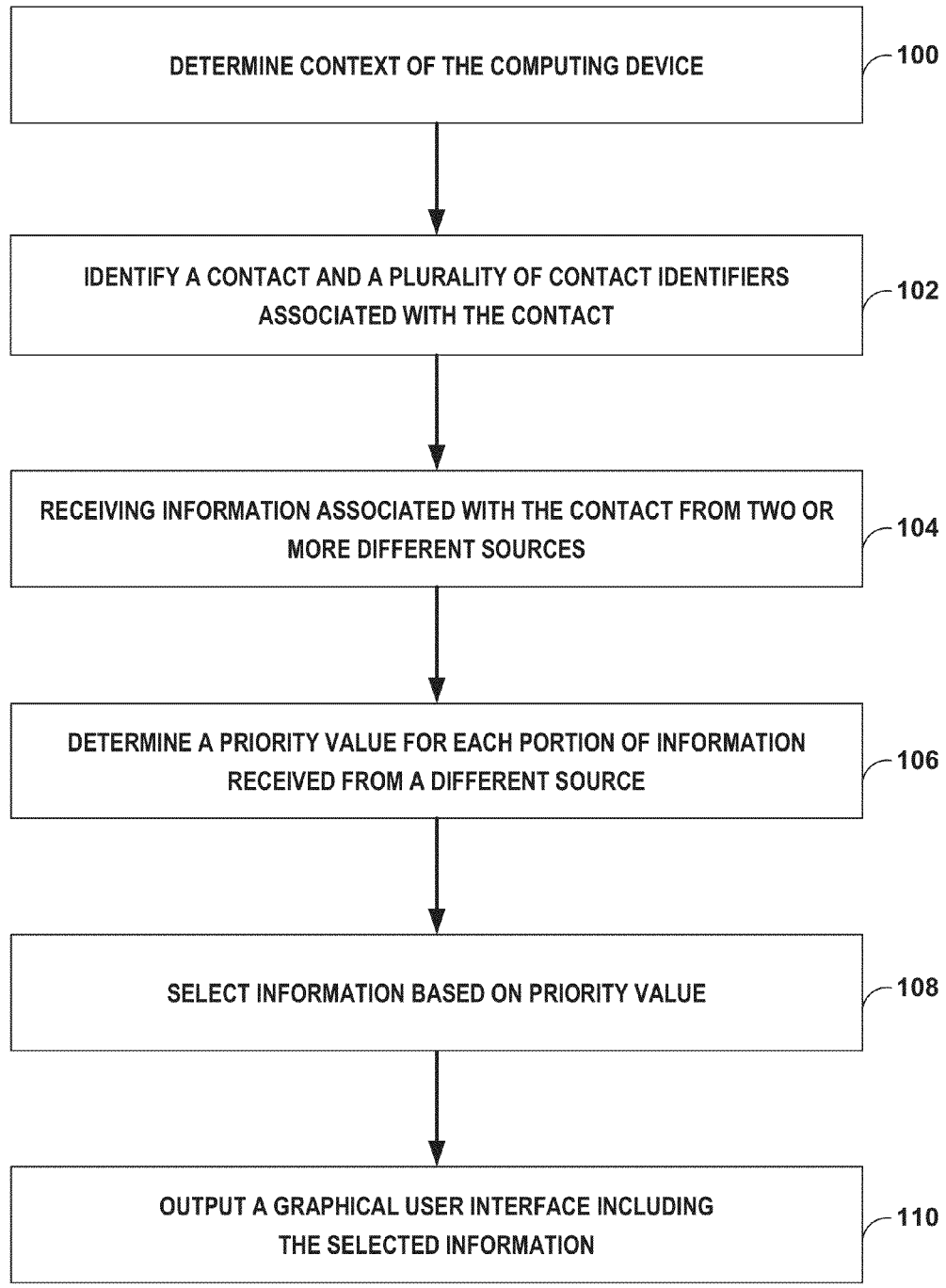
FIG. 5 is a flowchart illustrating an example process for aggregating person-based information, in accordance with one or more techniques of the present disclosure.

FIG. 5 is a flowchart illustrating an example process for aggregating person-based information, in accordance with one or more techniques of the present disclosure. For purposes of illustration only, the process of FIG. 5 is described below with respect to computing device 2 of FIGS. 1 and 2 and GUI 12 of FIG. 1.

In one example, computing device 2 may determine a context of computing device 2, the context of computing device 2 including a currently-executing application (100). Based on the context of computing device 2, computing device 2 may identify a contact and a plurality of contact identifiers associated with the contact (102). Computing device 2 may receive, from two or more different sources and based on at least one contact identifier from the plurality of contact identifiers, information associated with the contact, wherein the information includes a respective portion of information received from each of the two or more different sources (104). Computing device 2 may determine, based on the context of the computing device, a respective priority value for each of the portions of the information (106). Computing device 2 may select, based on the respective priority value, one or more portions of the information (108). Computing device 2 may output, for display, a graphical user interface including at least the selected one or more portions of the information (110).

Figure 6:
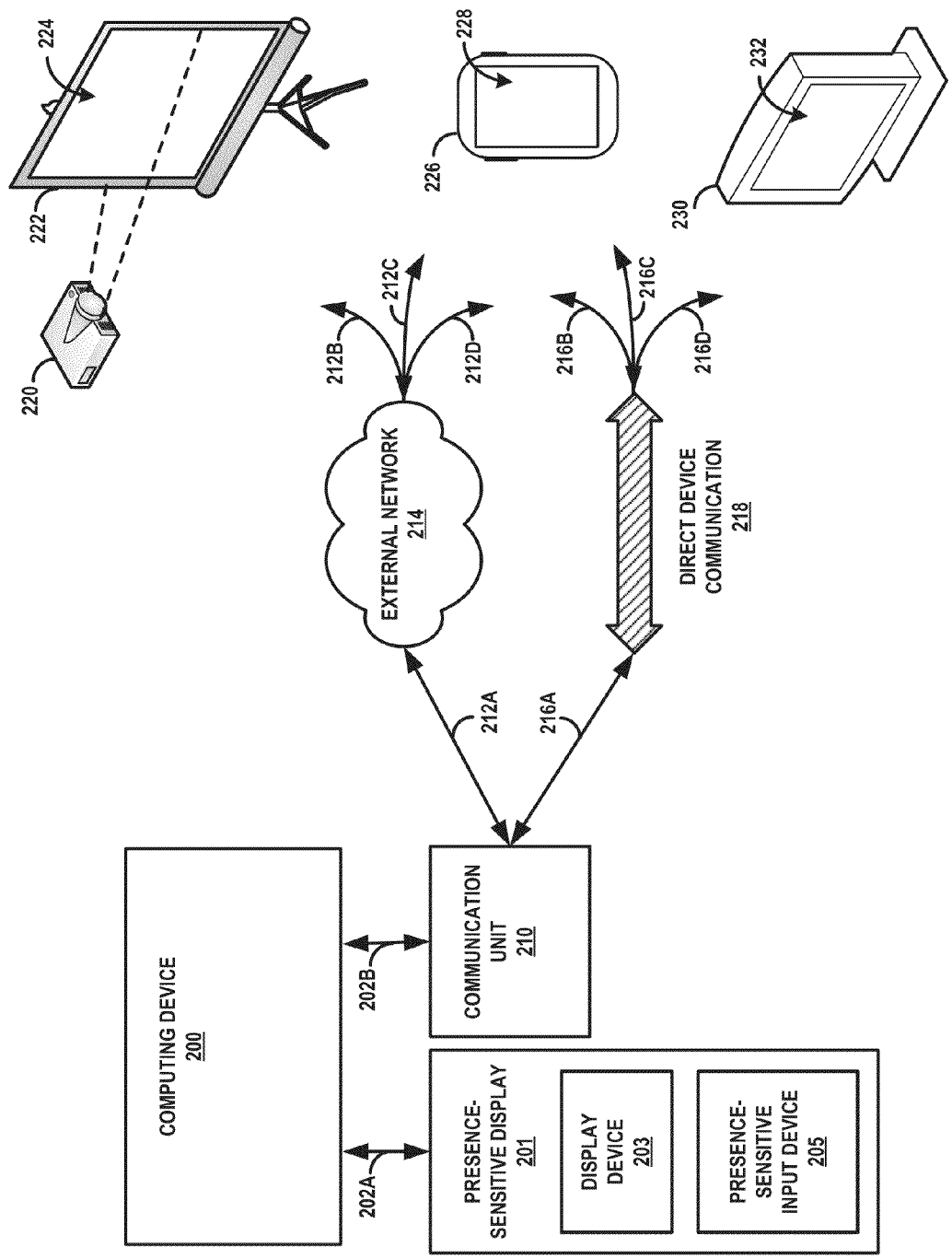
FIG. 6 is a block diagram illustrating an example computing device that outputs graphical content for display at a remote device, in accordance with one or more techniques of the present disclosure.

FIG. 6 is a block diagram illustrating an example computing device that outputs graphical content for display at a remote device, in accordance with one or more techniques of the present disclosure. Graphical content, generally, may include any visual information that may be output for display, such as text, images, a group of moving images, etc. The example shown in FIG. 6 includes a computing device 200, presence-sensitive display 201, communication unit 210, projector 220, projector screen 222, tablet device 226, and visual display device 230. Although shown for purposes of example in FIGS. 1 and 2 as a stand-alone computing device, a computing device may, generally, be any component or system that includes a processor or other suitable computing environment for executing software instructions and, for example, need not include a presence-sensitive display.

As shown in the example of FIG. 6, computing device 200 may be a processor that includes functionality as described with respect to processor 40 in FIG. 2. In such examples, computing device 200 may be operatively coupled to presence-sensitive display 201 by a communication channel 202A, which may be a system bus or other suitable connection. Computing device 200 may also be operatively coupled to communication unit 210, further described below, by a communication channel 202B, which may also be a system bus or other suitable connection. Although shown separately as an example in FIG. 6, computing device 200 may be operatively coupled to presence-sensitive display 201 and communication unit 210 by any number of one or more communication channels.

In other examples, such as illustrated previously in FIGS. 1-2, computing device 200 may be a portable or mobile device such as mobile phones (including smart phones), laptop computers, etc. In some examples, computing device 200 may be a desktop computers, tablet computers, smart television platforms, cameras, personal digital assistants (PDAs), servers, mainframes, etc.

Presence-sensitive display 201, as shown in FIG. 6, may include display device 203 and presence-sensitive input device 205. Display device 203 may, for example, receive data from computing device 200 and display the graphical content. In some examples, presence-sensitive input device 205 may determine one or more user inputs (e.g., continuous gestures, multi-touch gestures, single-touch gestures, etc.) at presence-sensitive display 201 using capacitive, inductive, and/or optical recognition techniques and send indications of such user input to computing device 200 using communication channel 202A. In some examples, presence-sensitive input device 205 may be physically positioned on top of display device 203 such that, when a user positions an input unit over a graphical element displayed by display device 203, the location at which presence-sensitive input device 205 corresponds to the location of display device 203 at which the graphical element is displayed.

As shown in FIG. 6, computing device 200 may also include and/or be operatively coupled with communication unit 210. Communication unit 210 may include functionality of communication unit 44 as described in FIG. 2. Examples of communication unit 210 may include a network interface card, an Ethernet card, an optical transceiver, a radio frequency transceiver, or any other type of device that can send and receive information. Other examples of such communication units may include Bluetooth, 3G, and WiFi radios, Universal Serial Bus (USB) interfaces, etc. Computing device 200 may also include and/or be operatively coupled with one or more other devices, e.g., input devices, output devices, memory, storage devices, etc. that are not shown in FIG. 6 for purposes of brevity and illustration.

FIG. 6 also illustrates a projector 220 and projector screen 222. Other such examples of projection devices may include electronic whiteboards, holographic display devices, and any other suitable devices for displaying graphical content. Projector 220 and project screen 222 may include one or more communication units that enable the respective devices to communicate with computing device 200. In some examples, the one or more communication units may enable communication between projector 220 and projector screen 222. Projector 220 may receive data from computing device 200 that includes graphical content. Projector 220, in response to receiving the data, may project the graphical content onto projector screen 222. In some examples, projector 220 may determine one or more user inputs (e.g., continuous gestures, multi-touch gestures, single-touch gestures, etc.) at projector screen using optical recognition or other suitable techniques and send indications of such user input using one or more communication units to computing device 200.

Projector screen 222, in some examples, may include a presence-sensitive display 224. Presence-sensitive display 224 may include a subset of functionality or all of the functionality of UI device 4 as described in this disclosure. In some examples, presence-sensitive display 224 may include additional functionality. Projector screen 222 (e.g., an electronic whiteboard), may receive data from computing device 200 and display the graphical content. In some examples, presence-sensitive display 224 may determine one or more user inputs (e.g., continuous gestures, multi-touch gestures, single-touch gestures, etc.) at projector screen 222 using capacitive, inductive, and/or optical recognition techniques and send indications of such user input using one or more communication units to computing device 200.

FIG. 6 also illustrates tablet device 226 and visual display device 230. Tablet device 226 and visual display device 230 may each include computing and connectivity capabilities. Examples of tablet device 226 may include e-reader devices, convertible notebook devices, hybrid slate devices, etc. Examples of visual display device 230 may include televisions, computer monitors, etc. As shown in FIG. 6, tablet device 226 may include a presence-sensitive display 228. Visual display device 230 may include a presence-sensitive display 232. Presence-sensitive displays 228, 232 may include a subset of functionality or all of the functionality of UI device 4 as described in this disclosure. In some examples, presence-sensitive displays 228, 232 may include additional functionality. In any case, presence-sensitive display 232, for example, may receive data from computing device 200 and display the graphical content. In some examples, presence-sensitive display 232 may determine one or more user inputs (e.g., continuous gestures, multi-touch gestures, single-touch gestures, etc.) at projector screen using capacitive, inductive, and/or optical recognition techniques and send indications of such user input using one or more communication units to computing device 200.

As described above, in some examples, computing device 200 may output graphical content for display at presence-sensitive display 201 that is coupled to computing device 200 by a system bus or other suitable communication channel. Computing device 200 may also output graphical content for display at one or more remote devices, such as projector 220, projector screen 222, tablet device 226, and visual display device 230. For instance, computing device 200 may execute one or more instructions to generate and/or modify graphical content in accordance with techniques of the present disclosure. Computing device 200 may output the data that includes the graphical content to a communication unit of computing device 200, such as communication unit 210. Communication unit 210 may send the data to one or more of the remote devices, such as projector 220, projector screen 222, tablet device 226, and/or visual display device 230. In this way, computing device 200 may output the graphical content for display at one or more of the remote devices. In some examples, one or more of the remote devices may output the graphical content at a presence-sensitive display that is included in and/or operatively coupled to the respective remote devices.

In some examples, computing device 200 may not output graphical content at presence-sensitive display 201 that is operatively coupled to computing device 200. In other examples, computing device 200 may output graphical content for display at both a presence-sensitive display 201 that is coupled to computing device 200 by communication channel 202A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by computing device 200 and output for display at presence-sensitive display 201 may be different than graphical content display output for display at one or more remote devices.

Computing device 200 may send and receive data using any suitable communication techniques. For example, computing device 200 may be operatively coupled to external network 214 using network link 212A. Each of the remote devices illustrated in FIG. 6 may be operatively coupled to network external network 214 by one of respective network links 212B, 212C, and 212D. External network 214 may include network hubs, network switches, network routers, etc., that are operatively inter-coupled thereby providing for the exchange of information between computing device 200 and the remote devices illustrated in FIG. 6. In some examples, network links 212A-212D may be Ethernet, ATM or other network connections. Such connections may be wireless and/or wired connections.

In some examples, computing device 200 may be operatively coupled to one or more of the remote devices included in FIG. 6 using direct device communication 218. Direct device communication 218 may include communications through which computing device 200 sends and receives data directly with a remote device, using wired or wireless communication. That is, in some examples of direct device communication 218, data sent by computing device 200 may not be forwarded by one or more additional devices before being received at the remote device, and vice-versa. Examples of direct device communication 218 may include Bluetooth, Near-Field Communication, Universal Serial Bus, WiFi, infrared, etc. One or more of the remote devices illustrated in FIG. 6 may be operatively coupled with computing device 200 by communication links 216A-216D. In some examples, communication links 212A-212D may be connections using Bluetooth, Near-Field Communication, Universal Serial Bus, infrared, etc. Such connections may be wireless and/or wired connections.

In accordance with techniques of the disclosure, computing device 200 may determine a context of computing device 200, which may include a currently-executing application (e.g., an application currently-executing at or by computing device 200). Based on the determined context, computing device 200 may identify a contact associated with the currently-executing application and may also identify a plurality of contact identifiers associated with the contact. Computing device 200 may receive, from two or more different sources and based on at least one contact identifier, information associated with the contact. The information may include a respective portion of information received from each of the two or more different sources. That is, each of the two or more different sources may provide a different portion of the information to computing device 200. Based on the context of computing device 200, computing device 200 may determine a respective priority value for each of the portion of the information. Computing device 200 may select, based on the priority the respective priority values, one or more portions of information and output, for display (e.g., at visual display device 230), a graphical user interface that includes at least the selected one or more portion of information.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media, which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), central processing units (CPUs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various embodiments of the disclosure have been described. These and other embodiments are within the scope of the following claims.

What is claimed is:

1. A method comprising:
   determining, by a computing device, a context of the computing device, the context of the computing device including a currently executing application, wherein the currently executing application is associated with at least a portion of a graphical user interface being output by the computing device;
   identifying, by the computing device and based on the context of the computing device, a contact associated with the currently executing application and a plurality of contact identifiers associated with the contact;
   receiving, by the computing device, from two or more different sources, and based on at least one contact identifier from the plurality of contact identifiers, information associated with the contact, wherein the information includes a respective portion of information received from each of the two or more different sources, and wherein the information associated with the contact includes information other than the plurality of contact identifiers associated with the contact;
   determining, by the computing device and based on the context of the computing device, a respective priority value for each of the portions of the information;
   selecting, by the computing device and based on the respective priority value, one or more portions of the information; and
   outputting, by the computing device and for display, a graphical user interface including at least the selected one or more portions of the information.

2. The method of claim 1, wherein determining the context of the computing device comprises identifying the currently executing application based at least in part on one of the process name, file name, or file path of the application associated with a process executing at the computing device.

3. The method of claim 1, wherein determining the context of the computing device comprises identifying the currently executing application based at least in part on a function call generated by the currently executing application.

4. The method of claim 1, wherein the identified contact is one or more of a person, an object, a location, a landmark, and a place of interest.

5. The method of claim 1, further comprising storing, at the computing device, the plurality of contact identifiers associated with the contact.

6. The method of claim 1, wherein receiving the information from the two or more different sources comprises receiving the information from the computing device and a computing system communicatively coupled to the computing device.

7. The method of claim 1, wherein receiving the information from the two or more different sources comprises:
generating, by the computing device, two or more requests for the information associated with the contact, wherein each of the two or more different sources is associated with a respective request of the two or more requests;
sending, from the computing device, the respective request to the different source from the two or more different sources associated with the respective request; and
receiving, by the computing device from the two or more different sources, the information.

8. The method of claim 7, wherein receiving the information from the two or more different sources comprises receiving at least a portion of the information from a restricted user account associated with one of the two or more different sources.

9. The method of claim 1, wherein receiving the information from the two or more different sources comprises:
authenticating, by the computing device and based on authentication information associated with the contact, a user account associated with the contact; and
responsive to the authenticating, receiving, by the computing device and based on the user account, the respective portion of the information.

10. The method of claim 1, wherein receiving the information from the two or more different sources further comprises:
receiving, by the computing device, information associated with at least one of 1) an identity of a source from the plurality of different sources, 2) application activity associated with at least one piece of information from the one or more pieces of information, or 3) a time and date associated with the at least one piece of information; and
receiving, by the computing device, information associated with the currently executing application including at least one of application usage information, or application identification information.

11. The method of claim 1, wherein the respective priority value for each of the portions of the information indicates a predicted relevance of a corresponding portion of the information to a user of the computing device.

12. The method of claim 1, wherein selecting, based on the respective priority value, the one or more portions of information comprises selecting each portion of the information determined to have a respective priority value that satisfies a threshold.

13. The method of claim 1, wherein determining the respective priority value for each of the portions of information comprises, responsive to determining that the contact is associated with a social network service, increasing the respective priority value by a configurable amount.

14. The method of claim 1, wherein determining the respective priority value for each of the portions of information comprises increasing the respective priority value proportionally to an amount of time that has elapsed since a software application associated with the portion of information was last executed by the computing device.

15. The method of claim 1, further comprising:
identifying, by the computing device, a respective software application associated with each of the portions of information,
wherein determining the priority rating for each of the portions of information comprises assigning, based on a characteristic of the respective software application, a priority value to each of the portions of the information.

16. The method of claim 1, wherein outputting the graphical user interface including at least the selected one or more portions of the information further comprises:
determining, by the computing device and based on the respective priority rating of each of the selected one or more portions of information, an order of the selected one or more portions of information; and
outputting, by the computing device and for display, the selected one or more portions of information in the order, wherein the respective priority rating for each portion of information from the portions of information satisfies a threshold value.

17. A computing device, comprising:
a display device; and
one or more processors, wherein the one or more processors are configured to:
determine a context of the computing device, the context of the computing device including a currently executing application, wherein the currently executing application is associated with at least a portion of a graphical user interface being output by the computing device;
identify, based on the context of the computing device, a contact associated with the currently executing application and a plurality of contact identifiers associated with the contact;
receive, from two or more different sources and based on at least one contact identifier from the plurality of contact identifiers, information associated with the contact, wherein the information includes a respective portion of information received from each of the two or more different sources, and wherein the information associated with the contact includes information other than the plurality of contact identifiers associated with the contact;
determine, based on the context of the computing device, a respective priority value for each of the portions of the information; select, based on the respective priority value, one or more portions of the information; and
output, for display, a graphical user interface including at least the selected one or more portions of the information.

18. The computing device of claim 17, wherein the respective priority value for each of the portions of the information indicates a predicted relevance of a corresponding portion of the information to a user of the computing device.

19. A non-transitory computer readable storage medium is encoded with instructions that, when executed, cause one or more processors of a computing device to:
determine a context of the computing device, the context of the computing device including a currently executing application, wherein the currently executing application is associated with at least a portion of a graphical user interface being output by the computing device;
identify, based on the context of the computing device, a contact associated with the currently executing application and a plurality of contact identifiers associated with the contact;
receive, from two or more different sources and based on at least one contact identifier from the plurality of contact identifiers, information associated with the contact, wherein the information includes a respective portion of information received from each of the two or more different sources, and wherein the information associated with the contact includes information other than the plurality of contact identifiers associated with the contact;

determine, based on the context of the computing device, a respective priority value for each of the portions of the information;

select, based on the respective priority value, one or more portions of the information; and output, for display, a graphical user interface including at least the selected one or more portions of the information.

20. The non-transitory computer-readable storage medium of claim 19, wherein the respective priority value for each of the portions of the information indicates a predicted relevance of a corresponding portion of the information to a user of the computing device.

* * * * *